United States Patent Office 3,078,512
Patented Feb. 26, 1963

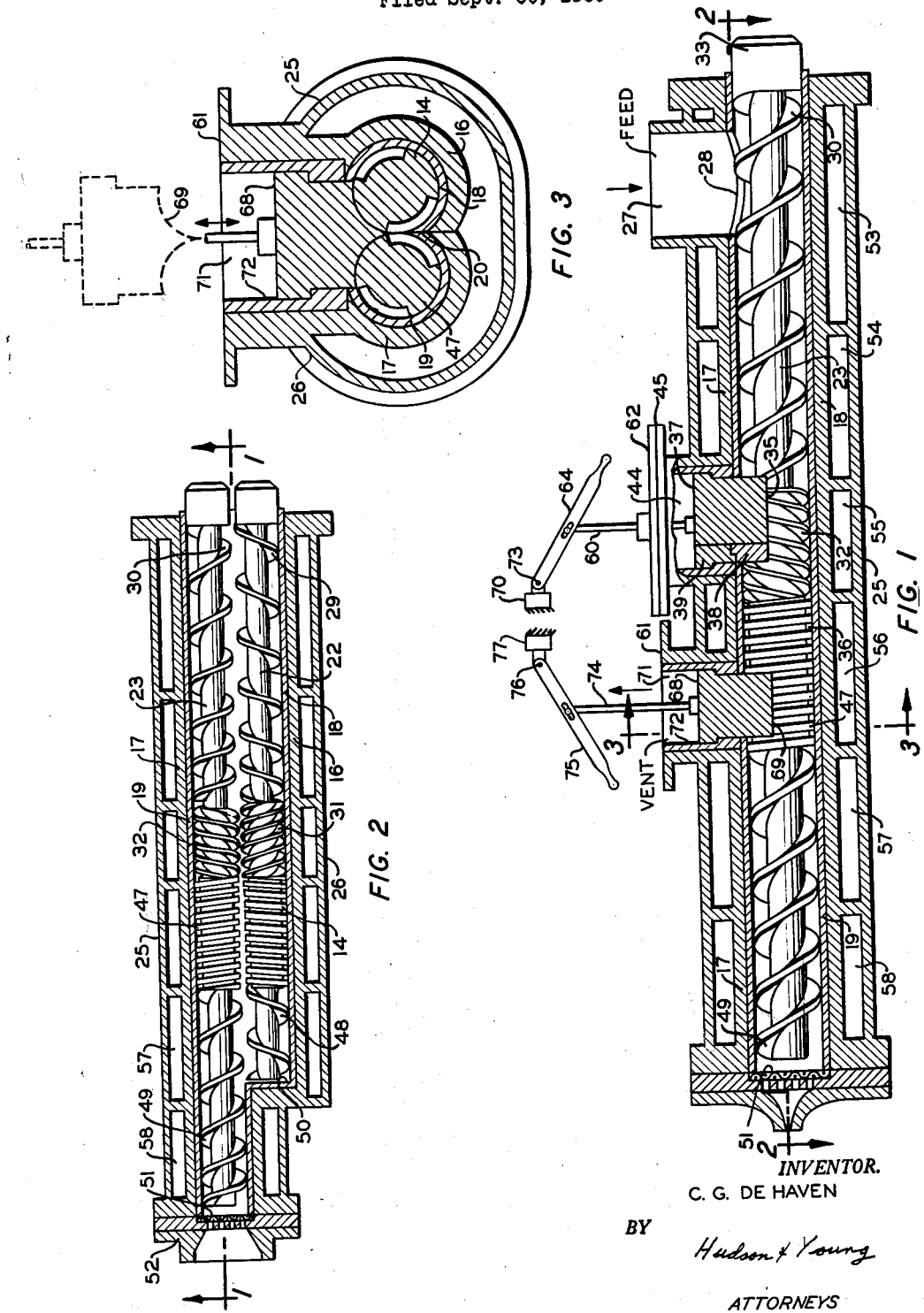

3,078,512
EXTRUDER VENT CLEANER
Clark G. De Haven, Bartlesville, Okla., assignor to Phillips Petroleum Company, a corporation of Delaware
Filed Sept. 30, 1960, Ser. No. 59,548
8 Claims. (Cl. 18—12)

This invention relates to the extrusion of plastic materials. In one aspect, it relates to the removal of volatiles from plastic materials in an extrusion drier.

It is known in the art to process plastic materials containing volatile liquids in apparatus which functions as a combination extruder and drier. For example, in L. J. Fuller, Reissue Patent No. 23,948, there is described an apparatus for mixing and conditioning plastics for extrusion and the release of volatile materials. In this type of apparatus and in other types of extrusion driers, a devolatilization chamber or port or other opening is provided within said apparatus to permit the escape of volatiles from the plastic material and from the apparatus. Since the extruder drier develops exceedingly high pressures, the escape of the volatiles is accomplished by the introduction of the plastic material into an area of reduced pressure. It is inevitable, therefore, that at least a portion of the plastic be entrained in the escaping gases or that a portion of the material be blown into the gas stream by the explosion of gas bubbles within the depressurized material. Heretofore, it has not been possible for most types of plastic materials to continuously operate in the extrusion drier due to this escape of plastic material through the devolatilization chamber or vent since the material tends to collect on the sides or the walls of the vent and bridge it over, therefore making it necessary to discontinue operation while said vent is cleaned. In addition, the loss of the valuable plastic material is undesirable. There have been attempts to prevent the rising of the thermoplastic material into the devolatilization chamber by various means such as the insertion of baffles within said vent or chamber, but at best these provide temporary relief and usually merely provide a smaller escape orifice which is more readily plugged.

It is an object of this invention to provide improved apparatus for the extrusion of plastic materials.

Another object of the invention is to provide an improved apparatus for mixing and extruding plastic materials containing volatile materials.

Still another object of the invention is to provide an improved apparatus for the removal of volatile liquids from plastic materials being extruded through an extrusion drier.

Yet another object of this invention is to provide an improved apparatus for the prevention of plugging of the devolatilization chamber or vent of an extrusion drier.

These and other objects of the invention will become more readily apparent from the following detailed description and discussion.

The foregoing objects are realized broadly by providing in an extruder having a worm-type feeding means operating within a casing surrounding said feed means, an opening in said casing, a devolatilization chamber in communication with said opening, a periodically operated reciprocating member closely fitting the interior surface of said devolatilization chamber to provide periodical removal of solids deposited on the interior surfaces of said vent or devolatilization chamber.

In one aspect of the invention, the lower surface of said member is shaped to fit the contour of the feed means. In another aspect of the invention, the periodically operated reciprocating member alternately permits the escape of volatiles and the cleaning of solids from the interior vent surfaces.

The apparatus of this invention is best described by reference to the accompanying drawings which illustrate the application of the method and apparatus of the invention with the Fuller type extruder. It will be understood by those skilled in the art that other types of extruders can be used. Also modifications may be made in the apparatus shown; for instance the reverse flights 31, 32 can be replaced by low pitch screws or even a short section without screw threads.

FIGURE 1 is a vertical section view of a typical apparatus utilized in carrying out the invention, the section being taken on line 1—1 of FIGURE 2;

FIGURE 2 is a plan view of the same apparatus taken in section on line 2—2 of FIGURE 1; and FIGURE 3 is a cross section taken on line 3—3 of FIGURE 1.

In the apparatus of the figures a double barrel 16, 17 is formed preferably of welded plates and is provided with liners 18, 19 meeting at 20 (FIGURE 3) and leaving a slot between the barrels. Feed worms 22, 23 with opposite pitches to their flights are positioned in barrels 16, 17 respectively, and are connected to be driven with opposite rotations so that their peripheries move downwardly together at the center (FIGURE 3).

Surrounding barrels 16, 17 are jackets 25, 26 for heating or cooling fluids, the jackets being divided into sections to aid in controlling independently the temperatures of successive portions of the worm feed.

A hopper 27 has a bottom opening 28 for feeding material downwardly into the receiving ends of the first flights 29, 30 of the feed worms 22, 23. These flights 29, 30 are right and left hand and generally helical in form, progressively decreasing in pitch to increase their ability to develop pressure.

Back pressure is developed by the reverse flights screw sections 31, 32 to which the material is delivered by the forward flights 29, 30. The parallel substantially adjacent worms 22, 23 thus carry the material forward and force it into reverse flights 31, 32 which in turn exert a retarding action on the forward movement of the material. The first result of these retarding influences is to squeeze out fluids, if present, which move from the high pressure areas in the reverse flight section (FIGURE 1) to lower pressure areas at the right, clearances being provided for this back flow. Liquids are drained off around the screw plug 33 provided on the worms 22, 23 at the entrances to the barrels, clearances being allowed between the screw plugs and the barrel liners for this purpose, and gases pass out through the vent 61.

The action of the forward flights 29, 30 forcing material into and through reverse flights 31, 32 generates heat within the material itself due to the working action of the worms creating internal friction within the material. The back pressure applied to the material and the heat developed by the internal friction simultaneously act on the material as it is being fed, working the material thoroughly under pressure and internally generated heat. The feed material is thus very completely mixed and conditioned for extrusion and for the reelase of volatiles. Various degrees of working and heating can be obtained by predetermined regulation of the length of the reverse flight in which the material is confined and by providing for release of material from these reverse flights 31, 32. The escaping material can be exposed to the atmosphere or can be subjected to a partial vacuum or blanketed with an inert gas.

The regulation of these various effects is obtained by varying the length of the cover surface 35 and confining the material in the reverse flights, the amount of back pressure and generated heat being proportional to the length of said cover surface.

To accomplish this, the opening 36 of the barrels 16, 17 is provided with a pressure cover 37 carrying a replaceable liner 38 held in place by retainer block 39. The under surfaces of the cover block and liner are shaped to fit between the peripheries of flights 31, 32 (FIGURE 3). Pressure cover 37 is enclosed within chamber 44 flanged at 45.

Chamber 44 is sealed by cover plate 62 to which there is attached an activating device 64, the stem 60 of which passes through cover plate 62 and is attached to the top portion of the pressure cover. Illustrated here is a simple mechanical device for raising or lowering pressure block 37. Stem 60 is operated vertically by the action of the actuating device 64 through its fulcrum point 73 supported by member 70. By varying the length of this cover surface 35 as well as raising or lowering presure block 37, it is possible to provide many degrees of working of the material by the reverse flights 31 and 32. A preferred apparatus for controlling the degree of working is disclosed in the copending application of John M. Folz, Serial No. 711,004, filed January 24, 1958, wherein the temperature of the material passing through the clearance between the pressure block and the compounding section is determined and said clearance is varied in response to changes in the temperature.

Upon emerging from the pressure cover block 37 the hot treated material is carried forward slowly by forward feed flights 14, 47 of worms 22, 23 kneading it and constantly exposing new surfaces for the release of volatiles. The feed material is then delivered to the auxiliary flight 48 and main discharge flight 49 running in the outlet ends of barrels 16, 17. These discharge flights have a much faster pitch, and the barrel 16 terminates short at the end wall 50 causing the material of auxiliary flight 48 to transfer laterally over to main extruder flight 49, which delivers the material through screen 51 to the extruder die 52. The material passing through the die can be formed to flow in any desired cross-sectional shape, such as a flat ribbon strip.

Forcing of the material through the reverse flights 31, 32 subjects the material to a concentrated squeezing and mixing and simultaneously develops heat within the individual particles. This heat can be utilized to remove residual volatile liquids from the material being treated. A portion of the moisture is removed in the first stage by draining back from flights 29 and 30 and the remaining moisture is vaporized off through vent 61 by heat developed by the internal friction in the previous stages.

The section of the barrels to which vent 61 is attached may be enlarged to provide any desired residence time for the release of volatiles and may be carried on at atmospheric or any desired pressure or at a partial vacuum. It is this vent section or devolatilization chamber which provides the problem solved by the instant invention. As shown in FIGURE 3, inserted within the vent chamber 71 is a closely fitting, periodically operated reciprocating member 68 which has the bottom surface 69 shaped to fit the periphery of the rotating worms so that when the piston or member 68 is in the down position surface 69 is permitted to approach quite closely the rotating worms and thus permit complete cleaning of vent chamber surfaces 72 and thus force the polymer back into the extruder. When the piston is in the up position (as shown in FIGURE 3), the volatiles are permitted to escape either into the atmosphere, as shown, or into a conduit, not shown. It is sometimes desirable to provide openings in the side of the vent chamber 71 so that the piston 68 is raised only slightly above the vent openings and thus does not need to be removed from the guiding surfaces 72.

The piston, plunger, or member may be actuated by any suitable means known to the art, such as mechanical, hydraulic or air actuation. It is also within the scope of the invention to operate the piston manually at periodic intervals to insure proper cleaning and to prevent plugging of the vent.

FIGURE 1 illustrates a simple mechanical actuating device 75 for periodically operating the plunger 68 so as to scrape the chamber walls 72 free of polymer. Attached to the plunger 68 is a stem 74 which is moved up and down by the action of the actuating device 75 operating about a fulcrum 76 supported by member 77.

Partial regulation of the temperature of the barrels at various stages can be accomplished by dividing jacket 25 into sections. For example, sections 53, 54, 55, 56, 57 and 58 can operate independently of each other to obtain the most desired results by maintaining the temperatures therein either higher or lower than, or the same as the temperature of the feed material.

The processing may be applied to a wide variety of ingredients for purposes of mixing and/or plasticizing, as well as for the extraction of liquids. The materials handled can be thermoplastic materials such as solid polymers of olefins or copolymers of olefins.

Although the materials normally processed are thermoplastic materials, including polyolefins and elastomers, it is also possible to process materials of the thermosetting type by the apparatus of this invention. The apparatus is particularly applicable in the treatment of materials containing large amounts of entrapped gases in large quantities of volatile material.

While a number of plastic materials can be worked in an extrusion dryer as above described, the advantages in increased yield and reduced losses appear to be particularly noted in the processing of rubbery coagulum produced in emulsion polymerization processes for synthetic rubber. Coagulum of natural rubber latex can also be processed advantageously by the invention. Broadly, the synthetic polymers to which the invention applies are the synthetic elastomers such as are prepared by emulsion polymerization of conjugated dienes having from 4 to 8 carbon atoms per molecule or the copolymerization of mixtures of such conjugated dienes or the copolymerization of such a conjugated diene with a copolymerizable monomer containing the $CH_2=C<$ group. Copolymers of isoolefins and conjugated dienes in which the isoolefin has from 4 to 8 carbon atoms per molecule and is in a major amount and the conjugated diene has from 4 to 6 carbon atoms per molecule in a minor amount, known generally as butyl rubber, can be employed in the invention. The synthetic elastomers which are preferred for processing in the invention are the butadiene-styrene copolymers, the butadiene-acrylonitrile copolymers, polybutadiene, polyisoprene, polychloroprene, and the like.

The feed materials can be introduced into the feed hopper of the extruder as a mixture of solids in a slurry or in any other conventional form. In general, the apparatus can be applied in the processing of materials to combine a heating, pressing and working under controlled conditions giving a very thorough plasticizing action combined with dewatering and degassing with the elimination of vent plugging.

The invention has been illustrated by description of its application in an apparatus of the type shown in L. J. Fuller, supra, but the invention is not limited in scope to this particular type of apparatus. While the periodically operated reciprocating member illustrated in the drawings is directed to a preferred embodiment of the invention, this is not to be taken in any limiting sense and it is within the scope of the invention to modify this apparatus. For instance, the reciprocating member can consist of two or more segments which can be operated alternately to clean the surfaces of the vent so as to permit volatile gases to escape at all times.

Although the composition and characteristics of the material being processed through the extruder varies widely and the frequency of operation of the member or piston is a function thereof, the operating cycle is readily determinable by one skilled in the art. For instance, with a material such as the styrene-butadiene synthetic rubber, a cycle of 1–10 minutes is satisfactory. For other materials, such as the more recent synthetic natural rubbers, shorter cycles may be necessary while for other materials longer cycles may be required.

Having thus described the invention by providing a specific embodiment thereof, it is to be understood that no undue restrictions or limitations are to be drawn by reason thereof and that many variations and modifications are within the scope of the invention.

What I claim is:

1. Apparatus for treating material comprising, in combination, a forward feeding means operating within a casing surrounding said feed means, an opening in said casing, a devolatilization chamber in communication with said opening and an area external of the apparatus combination so as to permit the escape of volatiles from said apparatus combination and a periodically operated reciprocating member closely fitting the interior surface of said chamber and adapted to permit the discharge of volatiles when said member is in the upper portion of its stroke and to alternately remove deposited solids from the interior surfaces of said chamber during its downward stroke.

2. Apparatus for extruding material comprising, in combination, a rotating worm by which said material is fed, a casing around said worm to contain said material and provided with an area of reduced pressure for the release of volatiles from said material, a devolatilization chamber in communication with said area of reduced pressure and an area external of the apparatus combination so as to permit the escape of volatiles from the apparatus combination and a periodically operated reciprocating member closely fitting the interior surface of said chamber and adapted to permit the discharge of volatiles from said chamber when said member is within the upper portion of its stroke and alternately removing deposited solids from the interior surfaces of said chamber during its downward stroke.

3. The apparatus of claim 2 wherein the bottom surface of said member is shaped to closely fit the periphery of said rotating worm.

4. Apparatus for extruding material comprising, in combination, a pair of parallel oppositely rotating worms by which said material is fed through said extruder, casing completely surrounding said rotating worms to contain said material, a feed means for said extruder, a discharge means for said extruder, an area of reduced pressure positioned between the fuel means and discharge means, a discharge orifice permitting the escape of volatiles from said material intermediate the feed means and discharge means of said apparatus, and adjacent said area of reduced pressure a devolatilization chamber in communication with said discharge orifice and a periodically operated reciprocating member closely fitting the interior surface of said chamber adapted to permit the discharge of volatiles from said discharge orifice when said reciprocating member is within the upper portion of its stroke and alternately removing deposited solids from the interior surfaces of said chamber when in the downward portion of its stroke.

5. In a system for extruding material comprising a pair of oppositely threaded and oppositely rotating feed screws subjecting the material to rotary forward feeding from opposite sides, surrounding casing means closely fitting the peripheries of said feed screws to maintain pressure therein, a pair of oppositely threaded and oppositely rotating reverse feed screws of predetermined lower feed rate closely fitted in said surrounding casing means and counteracting said forward feed and thereby working the material under pressure to develop a sudden temperature rise by friction in the material with the heated material being forced a predetermined distance through said reverse feed, a discharge from said reverse feed releasing the heated material outward from said reverse feed into an area of lower pressure to abruptly reduce the pressure on the material and permit the release of volatiles from said material, a discharge orifice in said casing adjacent said area of lower pressure to permit the escape of said volatiles from said casing, a devolatilization chamber in communication with said discharge orifice permitting the escape of the volatiles from the apparatus, forwardly feeding screws to remove the degassed materials from the area of reduced pressure to a restricted opening in said encasing means positioned downstream from said discharge orifice to provide discharge means from said obstructing rotary members releasing the material from said apparatus, the improvement which comprises positioning within said devolatilization chamber a periodically operated reciprocating member closely fitting the interior surfaces of said chamber and adapted to remove deposited solids from the interior surfaces of said chamber during its downstroke and return said solids into the forwardly feeding screws while permitting the discharge of volatiles from said chamber when said member is within the upper portion of its stroke.

6. The apparatus of claim 5 wherein the bottom surface of said reciprocating member is shaped to closely fit the periphery of said rotating forwardly feeding screws.

7. In a system for extruding material comprising a pair of oppositely threaded and oppositely rotating feed screws subjecting the material to rotary forward feeding from opposite sides, surrounding casing means closely fitting the peripheries of said feed screws to maintain pressure therein, a pair of oppositely rotating pressure feed means of predetermined lower feed rate closely fitted in said surrounding casing means and counteracting said forward feed and thereby working the material under pressure to develop a sudden temperature rise by friction in the material with the heated material being forced a predetermined distance through said pressure feed means, a discharge from said pressure feed means releasing the heated material outward from said pressure feed means into an area of lower pressure to abruptly reduce the pressure on the material and permit the release of volatiles from said material, a discharge orifice in said casing adjacent said area of lower pressure to permit the escape of said volatiles from said casing, a devolatilization chamber in communication with said discharge orifice permitting the escape of the volatiles from the apparatus, forwardly feeding screws to remove the degassed materials from the area of reduced pressure to a restricted opening in said encasing means positioned downstream from said discharge orifice to provide discharge means from said obstructing rotary members releasing the material from said apparatus, the improvement which comprises positioning within said devolatilization chamber a periodically operated reciprocating member closely fitting the interior surfaces of said chamber and adapted to remove deposited solids from the interior surfaces of said chamber during its downstroke and return said solids into the forwardly feeding screws while permitting the discharge of volatiles from said chamber when said member is within the upper portion of its stroke.

8. The apparatus of claim 7 wherein the bottom surface of said reciprocating member is shaped to closely fit the periphery of said rotating forwardly feeding screws.

References Cited in the file of this patent

UNITED STATES PATENTS

| Re. 23,948 | Fuller | Feb. 15, 1955 |
| 2,519,014 | Bankey | Aug. 15, 1950 |
| 2,736,058 | Dellheim | Feb. 28, 1956 |

FOREIGN PATENTS

| 581,927 | Canada | Aug. 25, 1959 |